United States Patent
Ichikawa

(10) Patent No.: US 9,610,637 B2
(45) Date of Patent: Apr. 4, 2017

(54) TAILSTOCK CONTROL DEVICE

(71) Applicant: OKUMA Corporation, Niwa-gun, Aichi (JP)

(72) Inventor: Yoshiichi Ichikawa, Aichi (JP)

(73) Assignee: OKUMA CORPORATION, Aichi (JP)

( * ) Notice: Subject to any disclaimer, the term of this patent is extended or adjusted under 35 U.S.C. 154(b) by 153 days.

(21) Appl. No.: 14/694,321

(22) Filed: Apr. 23, 2015

(65) Prior Publication Data
US 2015/0306671 A1 Oct. 29, 2015

(30) Foreign Application Priority Data

Apr. 25, 2014 (JP) ................. 2014-091859

(51) Int. Cl.
*B23Q 15/20* (2006.01)
*B23B 23/00* (2006.01)
*G05B 19/416* (2006.01)
*B23Q 15/12* (2006.01)
*B23Q 17/00* (2006.01)

(52) U.S. Cl.
CPC .......... *B23B 23/00* (2013.01); *G05B 19/4166* (2013.01); *B23Q 15/12* (2013.01); *B23Q 15/20* (2013.01); *B23Q 17/002* (2013.01); *B23Q 17/005* (2013.01); *G05B 2219/37589* (2013.01); *G05B 2219/42176* (2013.01); *Y10T 82/2502* (2015.01)

(58) Field of Classification Search
USPC .......................................................... 73/488
See application file for complete search history.

(56) References Cited

U.S. PATENT DOCUMENTS

| | | | | |
|---|---|---|---|---|
| 6,501,997 B1* | 12/2002 | Kakino | ............ | G05B 19/40937 318/568.1 |
| 6,551,033 B2* | 4/2003 | Kakino | ............ | B23G 1/16 408/3 |
| RE40,287 E * | 5/2008 | Tully | ............ | B23K 20/121 156/580 |
| 2009/0199685 A1* | 8/2009 | Ichikawa | ............ | B23B 23/00 82/148 |

FOREIGN PATENT DOCUMENTS

JP          200631514 A     11/2006

* cited by examiner

*Primary Examiner* — Willmon Fridie, Jr.
*Assistant Examiner* — Donte Brown
(74) *Attorney, Agent, or Firm* — Cantor Colburn LLP

(57) ABSTRACT

A tailstock control device includes a tailstock parameter setting unit that receives, in advance, setting of tailstock acceleration time ta, tailstock movement velocity V, drive torque measuring period t, and number n of drive torque measurements; a calculating unit that calculates acceleration zone distance La from the acceleration time ta and the movement velocity V; a calculating unit that calculates constant velocity zone distance Lb from the movement velocity V, the measuring period t, and the number n of measurements; a drive torque detecting unit that detects servo motor drive torque; and a control unit that sets La+Lb as drive torque measuring distance Lt and calculates servo motor drive torque limit value τc from drive torque T detected by the drive torque detecting unit when the tailstock is moved over La+Lb and also from a servo motor torque command value τa required for supporting a workpiece.

2 Claims, 4 Drawing Sheets

TAILSTOCK CONTROL DEVICE

CROSS REFERENCE TO RELATED APPLICATIONS

The present invention claims priority under 35 U.S.C. §119 to Japanese Application No. 2014-091859, filed on Apr. 25, 2014, the entire content of which is incorporated herein by reference

FIELD OF THE INVENTION

The present invention relates to a tailstock control device that controls drive of a tailstock which supports a workpiece using a tailstock center.

BACKGROUND OF THE INVENTION

In a numerically-controlled lathe, a tailstock for supporting a workpiece had in the past often been driven hydraulically, but in recent years, an electrically-driven tailstock driven and controlled by a servo motor has been employed. An electrically-driven tailstock supports a workpiece by pushing, against a center hole of the workpiece, a tailstock center mounted on the tailstock driven by a feed screw coupled to a servo motor. In supporting a workpiece with an electrically-driven tailstock, there exists a problem that, by simply driving and controlling the servo motor to obtain a tailstock support thrust by a drive torque supplied in consideration of the gear ratio of the drive system, a stable support thrust cannot be obtained, due to the transmission efficiency of the transmission mechanism of the drive system. This being the situation, while in a state in which the tailstock is positioned close to the workpiece, the tailstock center is driven at a constant velocity over a preset drive torque measuring distance from a preset position which does not allow contact with the workpiece, and drive torque of the servo motor during that time is detected. A torque value obtained by adding this detected drive torque and a torque command value for the servo motor required for supporting the workpiece is used as a limit value for servo motor drive torque.

The conventional art is now described with reference to FIG. 4. A tailstock support thrust preset in a tailstock thrust setting unit 1 is converted in a torque command converting unit 2 into a torque command value τa for a servo motor 11 while taking into account the gear ratio of the drive system. A support command unit 3 is caused to generate a support command by a manual operation or machining program (not shown), and activates a tailstock control unit 5. The activated tailstock control unit 5 controls torque of the servo motor 11 via a servo control unit 6 and an electric power amplifying unit 10 to thereby drive and control the tailstock, and also performs further positional control using a position feedback supplied by a position detector 12. Here, in the tailstock control unit 5, an average torque value τb, which is an average value of drive torque T detected by a drive torque detecting unit 9 when the tailstock center is moved at a constant velocity V, over a drive torque measuring distance L preset in a tailstock parameter setting unit 4, from a position that is preset in the tailstock parameter setting unit 4 and that is sufficiently spaced away from the workpiece (i.e., a position at which the distance between the tailstock center and the workpiece is greater than or equal to the drive torque measuring distance), is added to the servo motor torque command value τa required for supporting the workpiece, to thereby calculate a torque limit value τc. The calculated torque limit value τc is stored in a torque command value storing unit 7, and supplied to the servo control unit 6. The servo control unit 6 performs torque limiting control for the servo motor 11, in which the torque limit value τc serves as the upper limit.

According to the above-described configuration, the servo motor 11 for driving the tailstock is driven and controlled so that the tailstock center mounted on the tailstock fits into a center hole of the workpiece, and, by stopping the feed of the tailstock when the drive torque T reaches the torque limit value τc output from the servo control unit 6, the workpiece is supported by a predetermined support thrust.

According to the above-described conventional art, in a zone over the drive torque measuring distance from the preset position sufficiently spaced away from the workpiece, drive torque in an unloaded state is detected, which corresponds to a torque value that results in a drop in thrust due to the transmission efficiency of the transmission mechanism of the drive system. For this reason, in this zone, it is not possible to support the workpiece. For cases such as those in which the workpiece is held by hand when causing the tailstock center to provide support, it is desired to be able to start drive of the tailstock from a position closer to the workpiece. However, the preset drive torque measuring distance is a uniform distance for all cases regardless of the servo characteristics, and is set at a distance longer than that actually required for the drive torque measurement, so that, disadvantageously, the zone in which a workpiece cannot be supported is excessively large.

SUMMARY

According to the present invention, there is provided a tailstock control device that controls drive of a tailstock which is driven by a servo motor to push a tailstock center against a center hole of a workpiece so as to support the workpiece. The tailstock control device includes: a tailstock parameter setting unit that receives, in advance, setting of a tailstock acceleration time ta, a tailstock movement velocity V, a drive torque measuring period t, and a number n of times of drive torque measurement; a drive torque detecting unit that detects drive torque of the servo motor; an acceleration zone distance calculating unit that calculates, from the set acceleration time ta and movement velocity V, a tailstock acceleration zone distance La for drive torque measurement; a constant velocity zone distance calculating unit that calculates, based on the set movement velocity V, measuring period t, and number of measurements n, a tailstock constant velocity zone distance Lb for drive torque measurement; and a control unit that sets, as a drive torque measuring distance Lt, a value obtained by adding together the acceleration zone distance La and the constant velocity zone distance Lb, and calculates a limit value τc for drive torque of the servo motor based on a drive torque T detected by the drive torque detecting unit when the tailstock is moved over the drive torque measuring distance Lt, and also based on a torque command value τa for the servo motor required for supporting the workpiece.

According to the present invention, the distance for measuring drive torque is divided into a servo motor acceleration zone and a servo motor constant velocity zone. For the acceleration zone, the movement distance La in the acceleration zone is calculated based on the tailstock acceleration time ta and the tailstock movement velocity V. For the constant velocity zone, the movement distance Lb is calculated based on the drive torque measuring period t, the number n of times of drive torque measurement, and the tailstock movement velocity V. With this arrangement, for a machine having a servo motor characterized by short acceleration time, and in cases in which the tailstock movement velocity is low, the drive torque measuring distance can be reduced. As a result, advantageously, the distance over which the workpiece cannot be supported can be set to a minimum distance in accordance with the machine specifications, and it becomes possible to start drive of the tailstock from a position closer to the workpiece.

BRIEF DESCRIPTION OF THE DRAWINGS

Preferred embodiments of the present invention will be described in detail with reference to the following figures, wherein.

DESCRIPTION OF EMBODIMENTS

Figure 1:
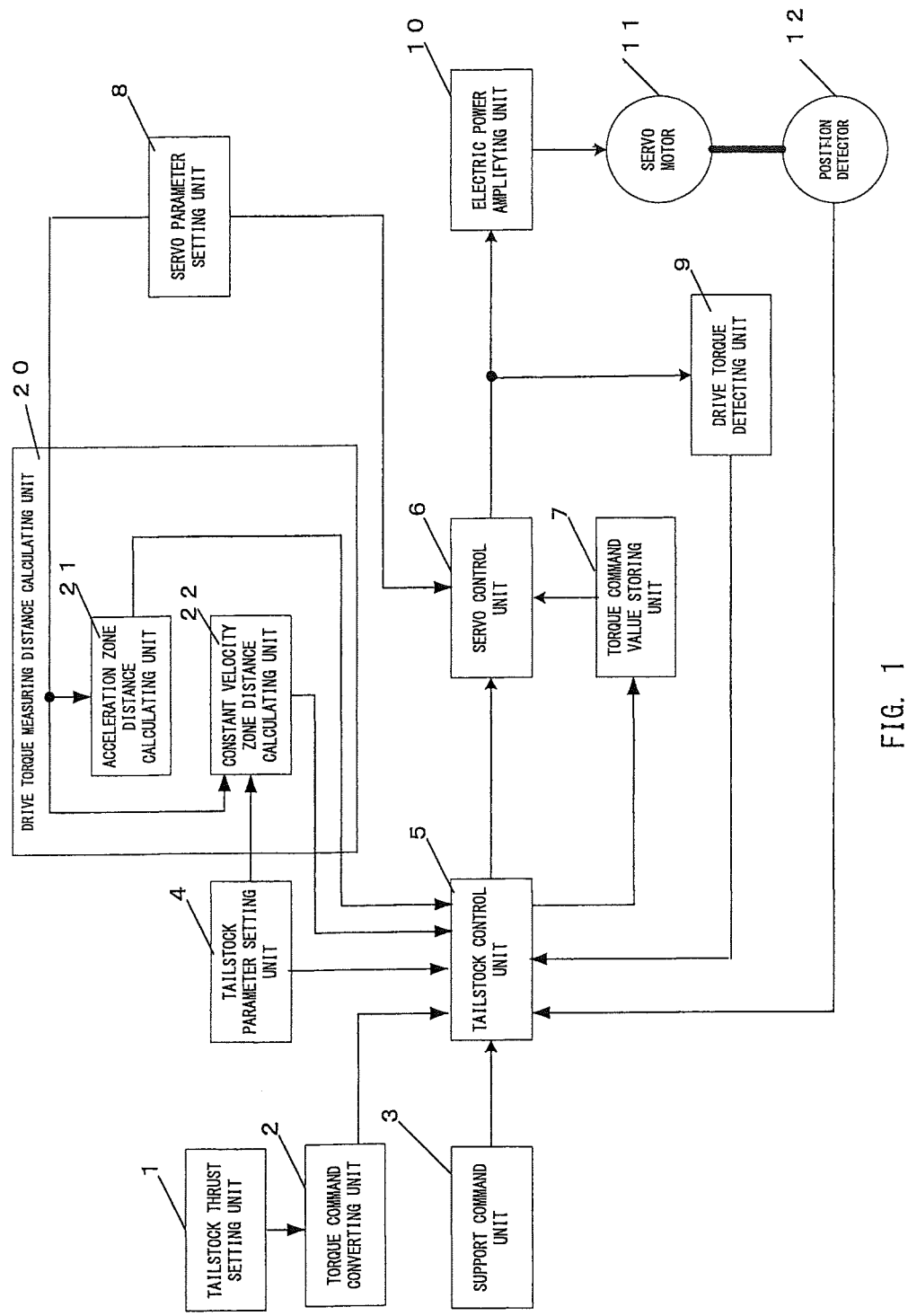
FIG. 1 is a block diagram showing a configuration of a tailstock control device according to an embodiment of the present invention.
Figure 2:
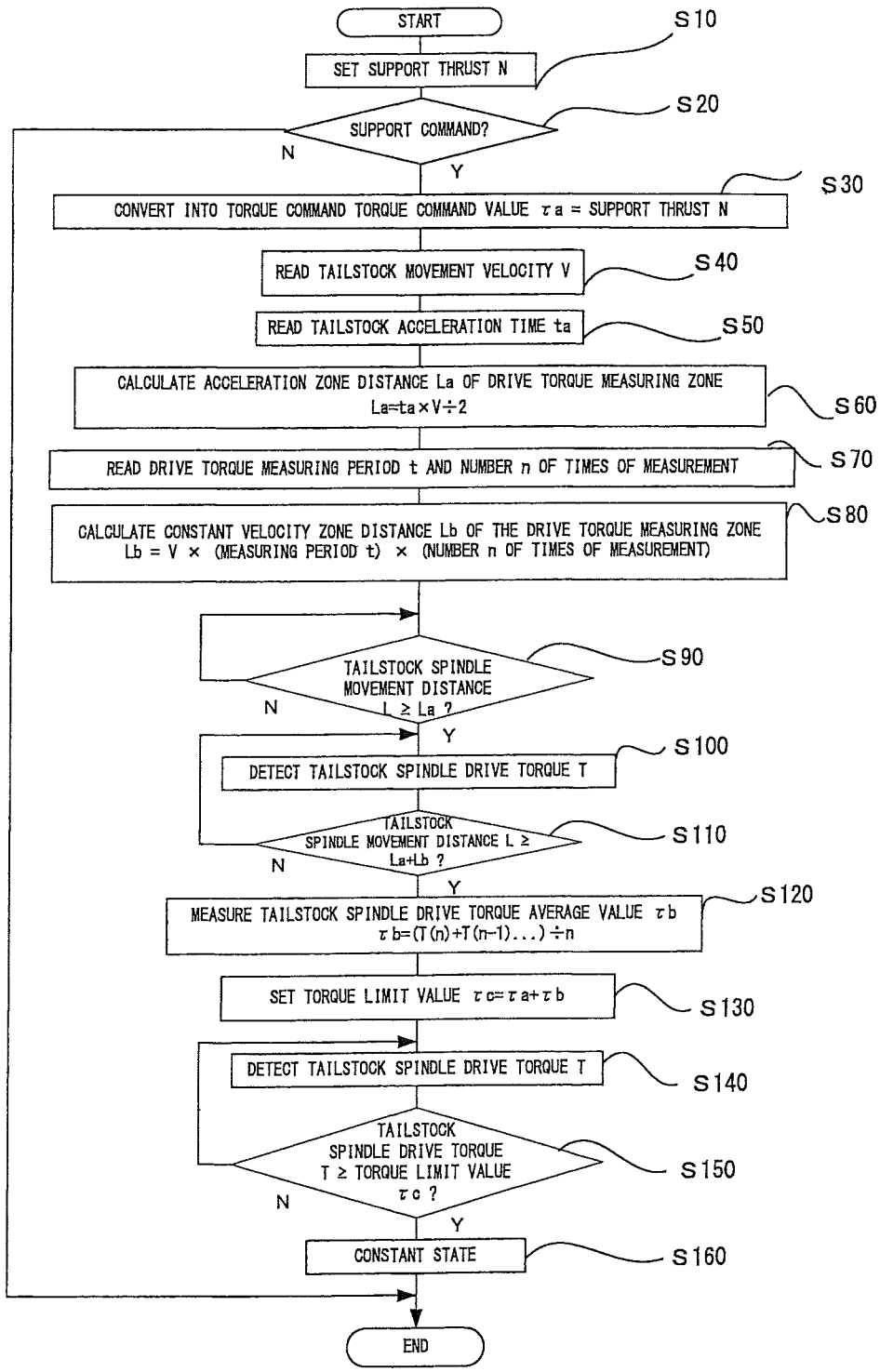
FIG. 2. is a flowchart showing a flow of tailstock control.

An embodiment of the present invention is described below with reference to the block diagram in FIG. 1 and the flowchart illustrating a tailstock control in FIG. 2. Concerning matters equivalent to those in the conventional art, detailed description is omitted.

A servo parameter setting unit 8 receives, in advance, setting of a tailstock movement velocity V, a tailstock acceleration time ta, a drive torque measuring period t, and a number n of times of drive torque measurement. Further, prior to performing a support control, a tailstock thrust setting unit 1 receives, in advance, setting of a tailstock thrust N for supporting a workpiece (step S10). Subsequently, when a support command is given by a manual operation or a machining program (not shown), a tailstock control unit 5 is activated via a support command unit 3 (step S20). In order to support a workpiece with a predetermined support thrust, the activated tailstock control unit 5 causes a torque command converting unit 2 to convert the tailstock thrust N set in the tailstock thrust setting unit 1 into a servo motor torque command value τa required for supporting the workpiece (step S30).

An acceleration zone distance calculating unit 21 within a drive torque measuring distance calculating unit 20 reads the tailstock movement velocity V and the tailstock acceleration time ta supplied from the servo parameter setting unit 8 (step S40, step S50), and calculates an acceleration zone distance La=ta×V÷2 from the tailstock movement velocity V and the tailstock acceleration time ta (step S60). Although the formula La=ta×V÷2 is used here because the present embodiment assumes that the velocity increases proportionally during acceleration (i.e., acceleration is constant), this formula for calculating the acceleration zone distance La may be changed according to the specifications of the tailstock and the like. A constant velocity zone distance calculating unit 22 reads the drive torque measuring period t and the number n of times of drive torque measurement set in a tailstock parameter setting unit 4 (step S70), and, from those values and the tailstock movement velocity V, calculates a constant velocity zone distance Lb=V×t×n for drive torque measurement (step S80). Furthermore, a distance Lt=La+Lb obtained by adding together the calculated acceleration zone distance La and constant velocity zone distance Lb is set as a drive torque measuring distance.

The tailstock control unit 5 reads the acceleration zone distance La and the constant velocity zone distance Lb of the drive torque measuring distance, and causes the tailstock (more precisely, the tailstock center) to be placed at a position away from the workpiece by a distance greater than or equal to the drive torque measuring distance Lt. From this position, movement of the tailstock is started. Until a tailstock spindle movement distance L from the start of the movement of the tailstock accumulates (amounts) to the acceleration zone distance La, only the movement is carried out, without performing drive torque measurement (step S90). After the movement distance has amounted to the acceleration zone distance La, drive torque T is detected until the tailstock spindle movement distance L additionally amounts to the constant velocity zone distance Lb (i.e., until L≥La+Lb becomes true), and after having amounted to that, an average value τb of the drive torque T is calculated (steps S100-S120). Subsequently, in the tailstock control unit 5, the servo motor torque command value τa required for supporting the workpiece and the drive torque average value τb are added together to calculate a torque limit value τc=τa+τb (step S130). This torque limit value τc is stored into a torque command value storing unit 7, and then supplied to a servo control unit 6. The servo control unit 6 performs torque limiting control for a servo motor 11, in which the torque limit value τc serves as the upper limit (steps S140-S160).

Figures 3A, 3B:
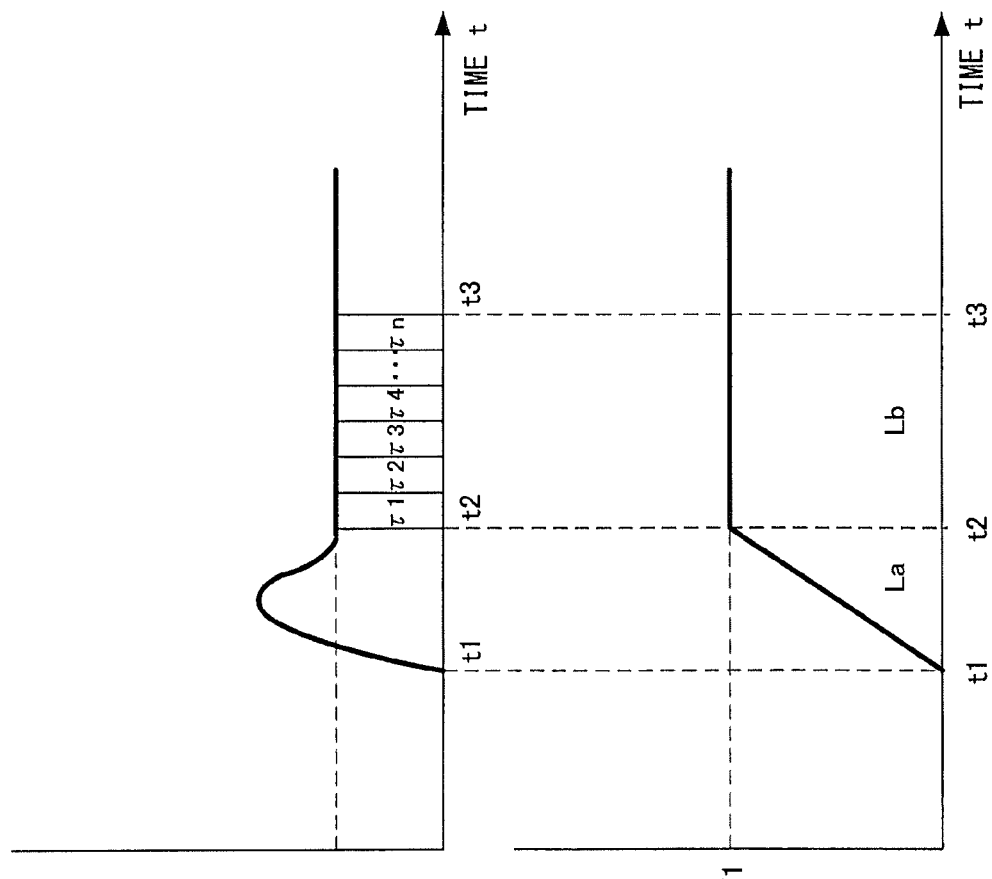
FIGS. 3A and 3B is an example timing chart showing the movement velocity and the drive torque in a drive torque measuring zone.
Figure 4:
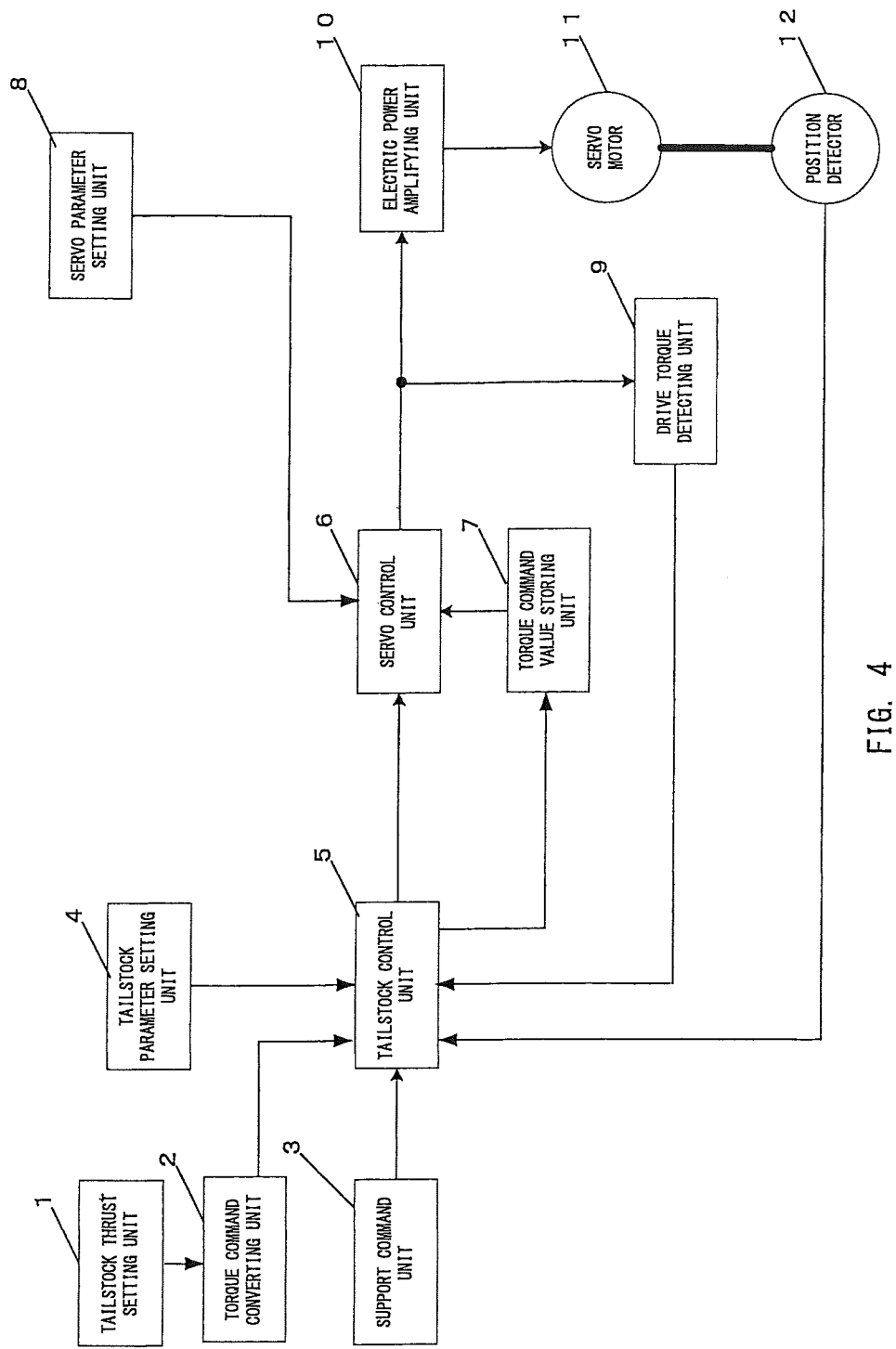
FIG. 4. is a block diagram showing a configuration of a tailstock control device according to conventional art.

Concerning the above-described operation for measuring the drive torque average value τb, a supplementary explanation is given with reference to the timing chart of FIGS. 3A and 3B. FIG. 3A shows an example change in the drive torque τ of the servo motor that drives the tailstock. FIG. 3B shows an example change in the tailstock movement velocity V from the start of the movement of the tailstock through the acceleration zone and the constant velocity zone. As can be understood from FIG. 3, the movement distance La within the acceleration zone during the acceleration time to (from time t1 to t2) is equal to La=(V1×(t2−t1))/2. During the movement over this movement distance La, drive torque measurement is not carried out. During the movement over the movement distance Lb (which is calculated from the measuring period t, the number n of times of measurement, and the movement velocity V) within the constant velocity zone during a movement time (from time t2 to t3), drive torque is measured for n number of times of measurement, and the drive torque average value τb=(τ1+τ2+τ3+ . . . τn−1+τn)/n is calculated. The movement distance Lb in the constant velocity zone is equal to Lb=V1×t×n.

The invention claimed is:

1. A tailstock control device that controls drive of a tailstock which is driven by a servo motor to push a tailstock center against a center hole of a workpiece so as to support the workpiece, the tailstock control device comprising:

a tailstock parameter setting unit that receives, in advance, setting of a tailstock acceleration time ta, a tailstock movement velocity V, a drive torque measuring period t, and a number n of times of drive torque measurement;

a drive torque detecting unit that detects drive torque of the servo motor;

an acceleration zone distance calculating unit that calculates, from the set acceleration time ta and movement velocity V, a tailstock acceleration zone distance La for drive torque measurement;

a constant velocity zone distance calculating unit that calculates, from the set movement velocity V, measuring period t, and number n of times of measurement, a tailstock constant velocity zone distance Lb for drive torque measurement; and a control unit that sets, as a drive torque measuring distance Lt, a value obtained by adding together the acceleration zone distance La and the constant velocity zone distance Lb, and calculates a limit value τc for drive torque of the servo motor from a drive torque T detected by the drive torque detecting unit when the tailstock is moved over the drive torque measuring distance Lt, and also from a torque command value τa for the servo motor required for supporting the workpiece.

2. The tailstock control device according to claim 1, wherein the control unit calculates the limit value τc by adding together the torque command value τa and a torque average value τb of the drive torque T detected when the tailstock is moved in a zone corresponding to the constant velocity zone distance Lb within the drive torque measuring distance Lt.

* * * * *